US007030906B2

(12) United States Patent
Auffret

(10) Patent No.: US 7,030,906 B2
(45) Date of Patent: Apr. 18, 2006

(54) DEVICE FOR VIDEO TRANSMISSION BETWEEN A CAMERA AND A CONTROL ROOM

(75) Inventor: Eric Auffret, Noyal sur Vilaine (FR)

(73) Assignee: Thomson Licensing, Boulogne-Billancourt (FR)

( * ) Notice: Subject to any disclaimer, the term of this patent is extended or adjusted under 35 U.S.C. 154(b) by 796 days.

(21) Appl. No.: 09/825,690

(22) Filed: Apr. 4, 2001

(65) Prior Publication Data

US 2001/0035905 A1 Nov. 1, 2001

(30) Foreign Application Priority Data

Apr. 4, 2000 (FR) .................................. 00 05065

(51) Int. Cl.
*H04N 7/18* (2006.01)

(52) U.S. Cl. ...................................................... 348/159

(58) Field of Classification Search ................ 348/159, 348/143, 154, 164; 340/539.13, 555, 556, 340/557, 686.1, 686.2; 455/456.1; H04N 7/18
See application file for complete search history.

(56) References Cited

U.S. PATENT DOCUMENTS

| | | | | |
|---|---|---|---|---|
| 4,040,004 | A * | 8/1977 | Walpole | 340/956 |
| 5,347,387 | A * | 9/1994 | Rice | 398/129 |
| 5,396,429 | A * | 3/1995 | Hanchett | 701/117 |
| 5,568,205 | A * | 10/1996 | Hurwitz | 348/723 |
| 5,598,208 | A * | 1/1997 | McClintock | 348/159 |
| 5,793,630 | A * | 8/1998 | Theimer et al. | 700/11 |
| 5,804,829 | A * | 9/1998 | Palmer | 250/504 H |
| 5,854,654 | A | 12/1998 | Zwahlen et al. | |
| 6,016,120 | A * | 1/2000 | McNabb et al. | 342/357.06 |
| 6,122,967 | A * | 9/2000 | Sword | 73/621 |
| 6,175,308 | B1 * | 1/2001 | Tallman et al. | 340/539.11 |
| 6,519,446 | B1 * | 2/2003 | Tawil et al. | 455/3.02 |
| 6,542,083 | B1 * | 4/2003 | Richley et al. | 340/825.49 |
| 6,681,398 | B1 * | 1/2004 | Verna | 725/141 |
| 2003/0011685 | A1 * | 1/2003 | Oka et al. | 348/211.2 |

FOREIGN PATENT DOCUMENTS

| | | |
|---|---|---|
| DE | 29802740 U1 | 8/1999 |
| EP | 0429349 A1 | 5/1991 |
| GB | 2217137 A | 10/1989 |

* cited by examiner

*Primary Examiner*—Nhon Diep
(74) *Attorney, Agent, or Firm*—Joseph S. Tripoli; Robert B. Levy; Jorge T. Villabon

(57) ABSTRACT

The invention relates to a wireless camera system which comprises a camera 10 fitted with a transmitter 11 for sending images by radio frequency and a directional receiving antenna 12 for receiving the images from the transmitter 11. The camera 10 comprises an identification means which transmits a locating signal. The antenna 12 comprises a locating means 13 for locating the locating signal and a servo-control means for directing the antenna at the transmitter 11 of the camera 10. The invention also relates to the camera 10 and the antenna 12 individually.

14 Claims, 4 Drawing Sheets

DEVICE FOR VIDEO TRANSMISSION BETWEEN A CAMERA AND A CONTROL ROOM

FIELD OF THE INVENTION

The invention relates to a device for video transmission between a camera and a control room. The invention lies in the domain of professional video cameras using wireless transmission.

BACKGROUND OF THE INVENTION

Professional video cameras are at the present time cameras which transmit a maximum of video information to a control room so as to obtain the best possible image quality. In a television studio, cameras use wire links of triaxial type. The wire link is however not the most suitable for mobile cameras. To be able to ensure the mobility of a cameraman in a studio or in a stadium, it is necessary to resort to one or more operators whose job is to untangle the cables.

For certain retransmissions of sports events, it is known to resort to wireless cameras. Cameras used at the present time use single-carrier type transmission which requires continuous aiming of the camera with the aid of a directional antenna, as is represented in FIG. 1.

FIG. 1 represents a system for wireless transmission between a camera and a control room according to the state of the art. A camera 1 is fitted with a single-carrier type HF transmitter which transmits the video signal via an antenna 2 placed for example on top of the camera 1. Given the considerable information bit rate (of the order of 50 Mbs compressed) the frequency of transmission is of the order of a gigahertz. Such a frequency range is, however, very sensitive to interference and in particular to echoes.

The use of a directional antenna 3 for reception, for example of parabolic type, makes it possible to circumvent the problems of echoes and ensures good amplification on reception. Since cameras intended for wireless use are chiefly mobile cameras, it is necessary to fit the directional antenna with means permitting a change of orientation and with a handle 4 enabling an operator to change his orientation. The orientation of the directional antenna is achieved either by guesswork, or with the aid of a sight.

Although such a system makes it possible to use a single operator to "accompany" the movements of the camera, this poses problems of lack of attentiveness. The operator must remain attentive throughout the duration of the shot, the duration possibly being very long and the camera movements possibly being unpredictable.

BRIEF DESCRIPTION OF THE INVENTION

The invention proposes a wireless camera system especially suited to use in the studio or in stadiums. The system according to the invention dispenses with the operator who aims the camera with the aid of the receiving antenna by implementing a self-aiming system. The system of the invention comprises a second transmitter on the camera whose purpose is to signal the position of the said camera to a device for servo-control of the antenna.

The invention is a video transmission system comprising a camera fitted with a transmitter for sending images by radio frequency and a directional receiving antenna for receiving the images from the transmitter. The camera comprises an identification means which transmits a locating signal. The antenna comprises a locating means for locating the locating signal and a servo-control means for directing the antenna at the transmitter of the camera.

The invention is also the video camera comprising a transmitter for sending images by radio frequency, and an identification means which transmits a locating signal for locating the camera.

The invention also relates to a directional antenna for receiving the images from the camera of the invention, the antenna comprising a locating means for locating the locating signal and a servocontrol means for directing the antenna at the transmitter of the camera.

BRIEF DESCRIPTION OF THE DRAWINGS

The invention will be better understood and other features and advantages will become apparent on reading the description which follows, the description making reference to the appended drawings in which.

PREFERRED EMBODIMENTS OF THE INVENTION

Figure 1:
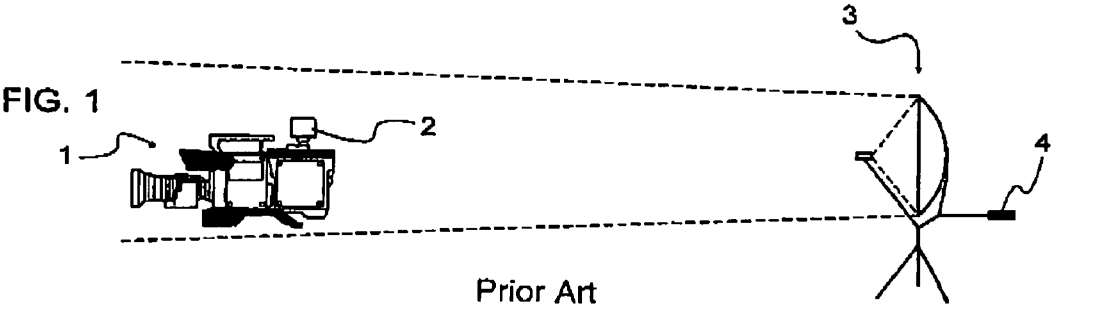
FIG. 1 represents a wireless video transmission system according to the state of the art.
Figure 2:
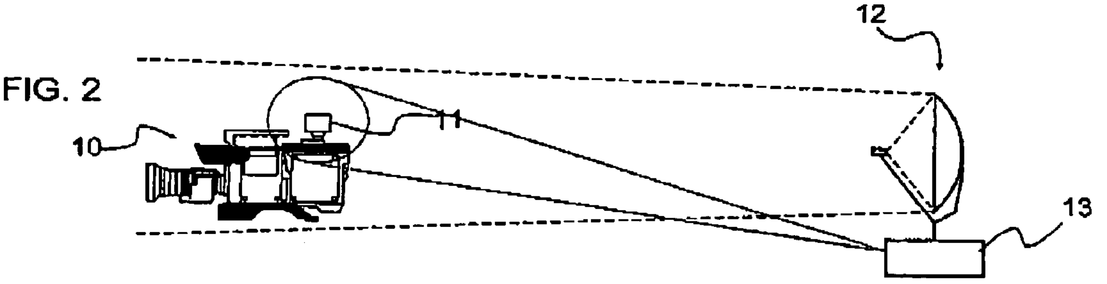
FIG. 2 represents a wireless video transmission system according to the invention.

FIG. 2 represents the general principle of the invention. A camera 11 is fitted with an HF transmitter and with a transmitting antenna 11. The camera 11 comprises, furthermore, an identification means which transmits a locating signal. A directional antenna 12 is fitted with a servo-control means controlled by a locating means 13.

The servo-control means consists for example of a motor for moving the directional antenna in azimuth, of a motor for moving the directional antenna in elevation and of at least one motor control device which controls the motors as a function of a preset. The servo-control means is not described in detail since numerous known devices may be used.

The locating means 13 cooperates with the means of identification of the camera so as to be able to locate the camera in order to provide the servo-control means with a preset so as to orient the directional antenna 12 at the transmitting antenna 11 or at the camera 10. Very many possibilities are offered for embodying the identification means and the locating means 13.

The identification means can consist of a radio transmitter, a visual emitter or a sound transmitter. The signal transmitted must make it possible to identify that a camera is involved and optionally make it possible to identify a camera from among several cameras. Regardless of the nature of the signal used, the identification of the camera can be achieved by altering the carrier of the signal, or subcarriers or a message despatched.

The use of radio or sound signals nevertheless has some drawbacks. These signals remain very sensitive to echoes, especially in stadiums. To circumvent the problems related to echoes, the locating means 13 can comprise a triangulation system, installation of which might be complex and hence rather impractical to use.

Preferably, the invention proposes the use of a visible light or infrared optical signal. The nature of these signals makes it possible to circumvent any echo problem. The invention more particularly proposes a solution using infrared for reasons of simplicity of implementation, reliability and unobtrusiveness.

Figure 3:
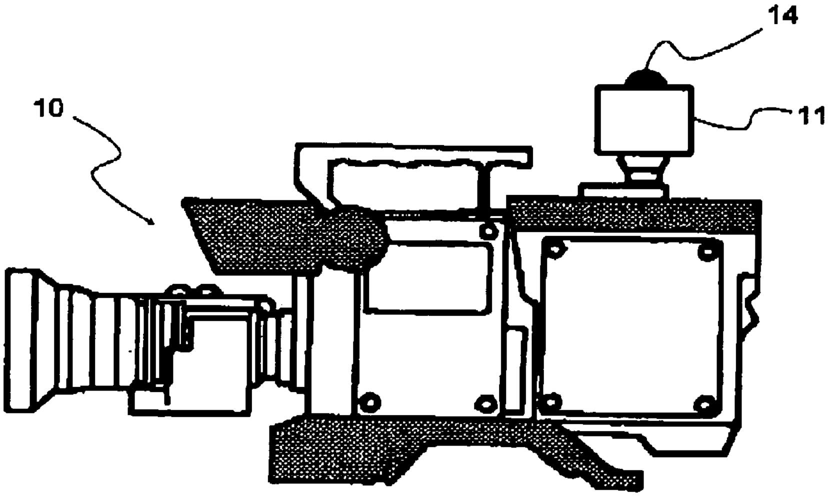
FIG. 3 represents a camera equipped for wireless video transmission according to the invention.

FIG. 3 shows an exemplary embodiment of a camera 10 using an infrared transmitter 14 as identification means. Preferably, the infrared transmitter 14 is placed on the top of the hood protecting the transmitting antenna 11. This position is favoured since it allows good visibility of the infrared transmitter 14 whilst having a position which virtually coincides with the transmitting antenna 11. It goes without saying that other positions of the infrared transmitter 14 are possible.

Figure 4:
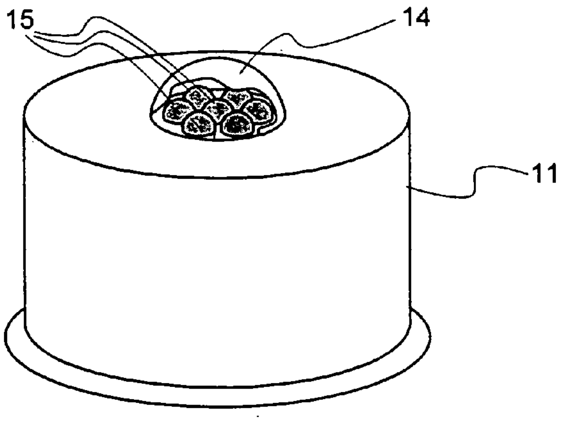
FIGS. 4 and 5 represent a device for identification of the camera of FIG. 3.
Figure 5:
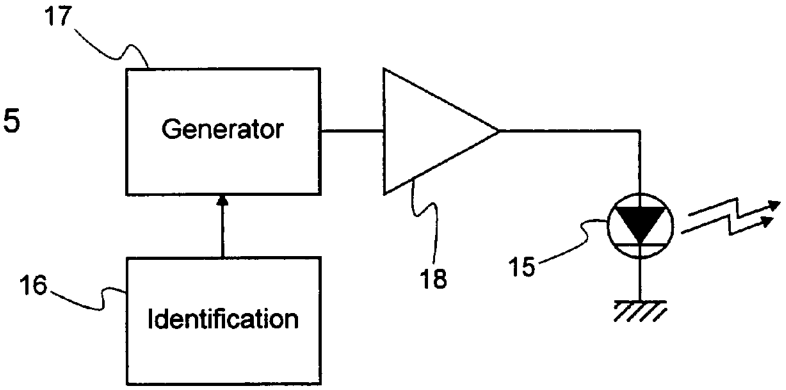

FIG. 4 shows that the infrared transmitter 14 can consist of one or more infrared diodes 15 surmounted by a Fresnel lens allowing IR emission at 180°. FIG. 5 gives an example of the infrared transmitter control circuit. A programmable identification circuit 16 stores a camera number in memory. For reasons of simplicity of embodiment and ease of use, the identification circuit consists for example of micro-switch (or jumpers) fitted with pull-up resistors (or pulling to zero resistors). Three micro-switch thus make it possible to number 8 cameras from 0 to 7.

A generator circuit 17 receives the camera number and provides an electrical identification signal. An amplifier 18 adapts the electrical identification signal in terms of current and voltage for optimal powering of the infrared diode or diodes 15 which will emit an infrared identification signal representative of the electrical identification signal. Several equivalent possibilities can be envisaged independently or combined.

First possibility: transmission of a low bit rate code. The electrical signal corresponds to a baseband coding of the camera number. Use is made of a frame with nine bits, the first of which is always equal to zero, the other bits producing a thermometric coding:

TABLE 1

| 0 | 000000001 |
| 1 | 000000011 |
| . | . |
| . | . |
| . | . |
| 6 | 001111111 |
| 7 | 011111111 |

The code to be transmitted is then transformed with the aid of a baseband transmission format, for example of RZ type. The infrared transmission corresponds to a flashing of the diodes identifying one camera from among several.

Second possibility: transmission of a signal modulated with the aid of a subcarrier. The electrical identification signal is a square signal whose frequency is representative of the camera number:

TABLE 2

| Camera Number | Frequency of the Identification Signal |
|---|---|
| 0 | 100 kHz |
| 1 | 110 kHz |
| . | . |

TABLE 2-continued

| Camera Number | Frequency of the Identification Signal |
|---|---|
| . | . |
| . | . |
| 6 | 160 kHz |
| 7 | 170 kHz |

The flashing frequency of the diodes makes it possible to identify the camera number.

Other possibilities for identifying the cameras are possible. For example, the person skilled in the art can use IR laser diodes whose radiation frequency is specific to each camera it is then sufficient to power the diodes simply to identify a camera.

If visible light is used, the same identification possibilities are possible using diodes of one or several colours.

A first embodiment of a receiving antenna 12 will now be described with reference to FIGS. 6 to 8. The receiving antenna 12 comprises a parabola-shaped reflector 20 and a source 21 (or receiving head) held at the focus of the parabola by at least one arm 22. The reflector 20 and the source 21 cooperate according to well-known principles in order to receive the electromagnetic waves arriving in a reception cone 23 whose generatrices form an angle a with respect to the central axis 24 of the parabola.

Four infrared detectors 25 are disposed around the perimeter of the reflector 20, the four detectors 25 forming, for example, the vertices of a square. To obtain correct operation no detector 25 should be masked by the arm 22. Each detector 25 includes at least one IR sensor fitted with at least one Fresnel lens which defines a detection cone 26 of aperture $\beta$, the detection cone being a cone of revolution for which the angle $\beta$, represents the angle between two diametrically opposite generatrices, $\beta$ being for example 90°. The generatrix of each detection cone 26 which passes through the central axis 24 of the parabola forms an angle $\gamma$ with the said central axis 24. The intersection of the detection cones 26 forms a servo-control cone 27 of pseudo-square cross-section, represented hatched in FIG. 7. To obtain good servo-control of the tracking of the transmitter of the camera, the servo-control cone 27 should be inscribed within the reception cone 23.

The principle of operation of the servo-control of this antenna consists in moving the antenna in such a way as to have the four detectors simultaneously detecting the presence of the infrared transmitter 14 of the camera to be tracked. The various values of the angles $\alpha$, $\beta$ and $\gamma$ as well as the distance D separating two diametrically opposite detectors 25 define the operating domains of such a system.

The angles $\beta$ and $\gamma$ make it possible to determine the zone "monitored" by the detectors 26. It is not necessary to monitor a zone over an angle $\psi$ of greater than 180°, the camera having little chance of going outside a monitored zone of this kind. Moreover, the smaller the angle $\beta$, the more the Fresnel lens is focused on the sensor and the better is the detection sensitivity.

The angle $\gamma$ and the distance D define the minimum operating distance D1 through the following relation: $D1=D/(2 \times \sin(\gamma))$. The person skilled in the art will readily observe that the larger the angle $\gamma$, the more the minimum operating distance decreases.

The angles $\alpha$ and $\gamma$ and the distance D also define the operating distance D2 which corresponds to correct servo-control of the antenna. The operating distance D2 is infinite when the angle $\gamma$ is less than or equal to the angle $\alpha$ and is defined by the following relation in other cases: D2=D×sin (α)/(2×sin(γ)×(sin(γ)−sin(α))). The person skilled in the art will observe that the operating distance diminishes very rapidly the further apart are γ and α.

Very many compromises are possible. Moreover, account should also be take of the fact that the maximum operating distance is also limited by the transmitting power of the infrared transmitter 14 and by the sensitivity of the detectors 25, this maximum operating distance lying, for example, within a range of 30 to 50 meters.

By way of example, for a reception cone 23 having an angle α of 5° and a distance D of 40 cm, by choosing an angle γ lying between 5° and 5.2° it is possible to obtain an operating distance D2 of greater than 50 m whilst having a minimum operating distance D1 of between 2.2 and 2.3 m. Furthermore, to have good reception, it is preferable to elevate the antenna so as to circumvent any obstacles (such as a person or a stage set). Appropriate elevating of the antenna also makes it possible to ensure the minimum operating distance.

It is possible to reduce the distance between the detectors 25 by placing them inside the reception cone 23 so as to improve the operation of the detectors but this also has the effect of reducing the sensitivity of the antenna through the addition of a masking zone.

Figure 6:
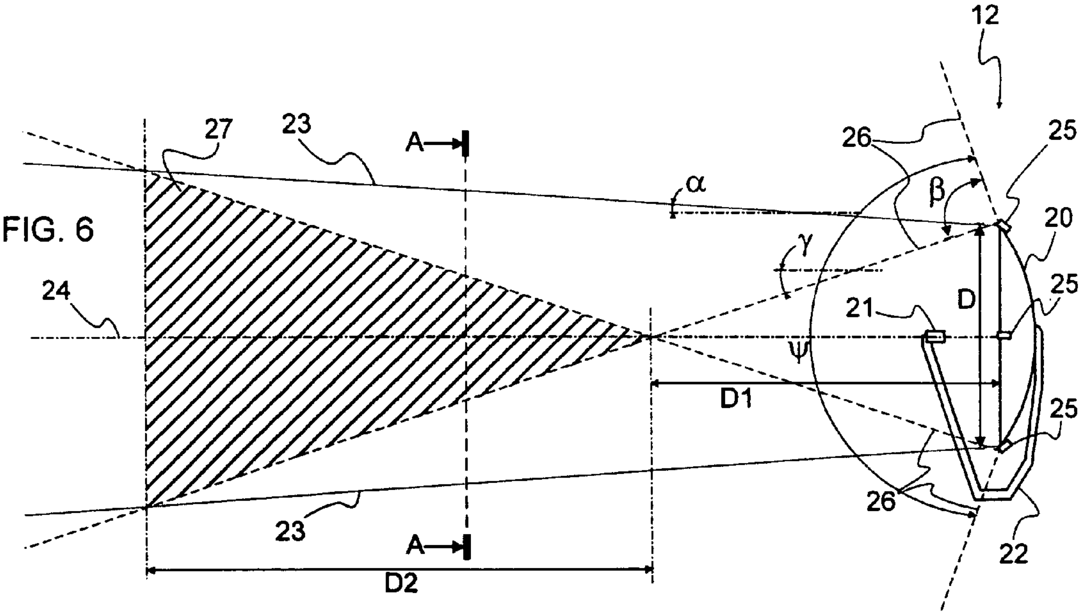
FIGS. 6 to 8 illustrate a first embodiment of an antenna according to the invention.
Figure 7:
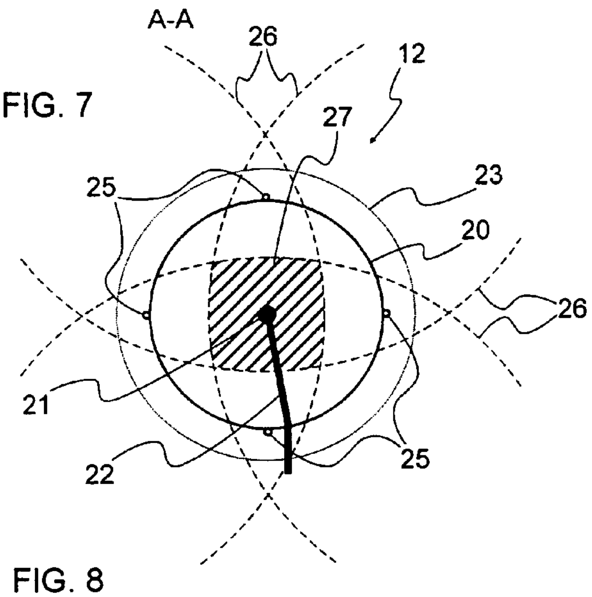
Figure 8:
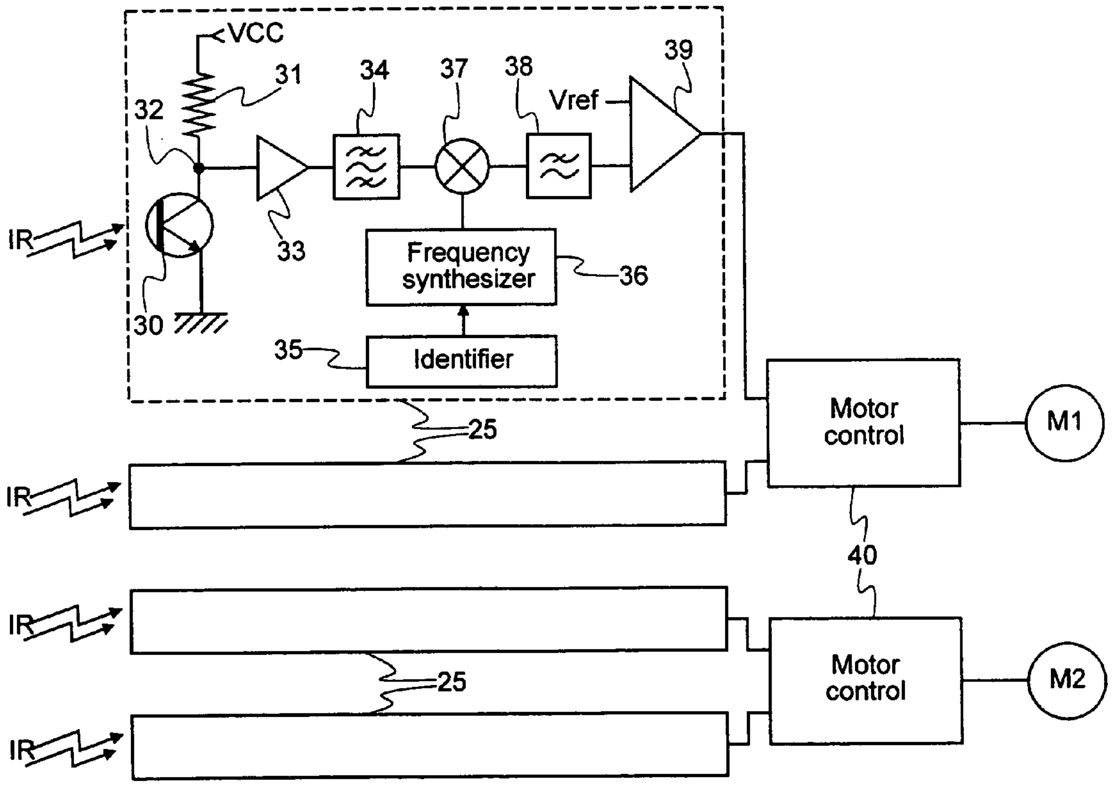

The camera detection system described in FIGS. 6 and 7 is relatively simple to implement. FIG. 8 represents the electrical operation of the detectors 25 in greater detail. The system set forth in this exemplary embodiment operates with an infrared transmitter using a subcarrier to identify the camera.

The infrared sensor is a photo-transistor 30 operating in infrared radiation. The photo-transistor 30 has its collector-emitter path connected between a voltage source VCC and earth by way of a resistor 31. The current in the collector of the photo-transistor 30 is proportional to the infrared radiation received on its base. The variations in voltage at the point of connection 32 between the resistor 31 and the photo-transistor 30 are found to be proportional to the infrared radiation received by the photo-transistor 30. An amplifier 33 amplifies the variations in voltage of the connection point 32. A band-pass filter 34 is connected at the output of the amplifier 33 so as to limit the signal to the frequencies of the subcarriers to be detected. As the person skilled in the art is aware, the band-pass filter 34 and the amplifier 33 can be interchanged or even combined into a single circuit. A programmable identification circuit 35 stores the number of the camera to be detected, the identification circuit 35 being of the same type as that used in the infrared transmitter. A frequency synthesizer 36 receives the camera identification number and provides the subcarrier frequency associated therewith, for example one of the frequencies indicated in Table 2. It goes without saying that the person skilled in the art can, by choice, use a single identification circuit 35 and/or a single frequency synthesizer 36 or incorporate one or both circuits into each detector 25.

A mixer 37 performs a multiplication of the signals originating on the one hand from the band-pass filter 34 and on the other hand from the frequency synthesizer 36. The signal output by the mixer 37 corresponds to the signal output by the band-pass filter 34, the spectrum of which is shifted by the frequency of the signal provided by the frequency synthesizer 36. A low-pass filter 38 is connected to the output of the mixer 37. The cut-off frequency and the filtering slope of the low pass filter are chosen for maximum rejection of the frequencies corresponding to the other subcarriers, in our example at least 100 dB of reduction is ensured in respect of frequencies greater than or equal to 10 kHz. As may be observed by the person skilled in the art, the assembly consisting of the frequency synthesizer 36, the mixer 37 and the low-pass filter 38 embodies a band-pass filter whose central spectral line is adjustable. When the photo-transistor 30 receives an infrared signal whose subcarrier corresponds to the frequency of the signal output by the frequency synthesizer 36 then the signal output by the low-pass filter 38 is non-zero.

A comparator 39 receives on the one hand the signal output by the low-pass filter 38 and on the other hand a reference voltage Vref. The comparator 39 provides a signal of binary type indicating whether or not the right camera has been detected. The signal output by the comparator 39 corresponds to the signal output by the infrared detector 25. The reference voltage Vref must be as low as possible so as to increase the sensitivity of detection in the zone covered by the infrared detector 25 but it must be high enough to render the infrared detector 25 insensitive to noise.

A motor control circuit 40 receives the output signals from two diametrically opposite infrared detectors 25 and provides a preset to a motor M1 or M2. Each motor M1 or M2 is coupled with the reflector 20 so as to produce a rotation about an axis perpendicular to the axis of the two sensors linked to the control circuit 40 which is connected thereto. The object of the signal provided to the motor is to displace the reflector 20 in the direction of one or other of the detectors 25 connected to the control circuit 40. If just one of the two signals received by the control circuit indicates the presence of the camera, then the control circuit 40 turns the associated motor M1 or M2 in the direction of the sensor which receives the signal. If both infrared detectors 25 simultaneously indicate the same information, the control circuit 40 does not turn the motor.

Figure 9:
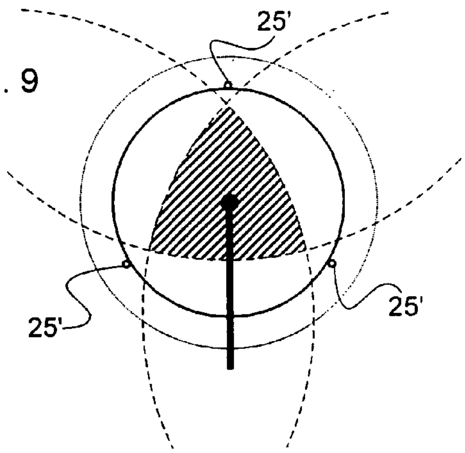
FIG. 9 represents a variant of the first embodiment of the antenna.

As it has already been indicated, there are numerous variants of this first embodiment. Among the possible variants, it should be indicated that in order to locate the camera, it is not necessary to have four infrared detectors, three detectors 25' being sufficient as shown in FIG. 9. The person skilled in the art will observe that any number and any position of the detectors may be employed to perform the locating function but that certain configurations, in particular the one shown in FIG. 7, make it possible to simplify the control devices.

The use of visible light may present an advantage when it is envisaged that the distance between the cameras and the antennas be significant. The term significant distance should be understood for example to mean a distance of greater than 100 m. This is because the use of high power in the infrared is somewhat regulated. Care should then be taken that no camera is in the field filmed by another camera so as to avoid impairing the image. To use the first embodiment with visible light, it is preferably to use optical sensors centred on the wavelength of the diodes used so as to limit the surrounding noise.

Figure 10:
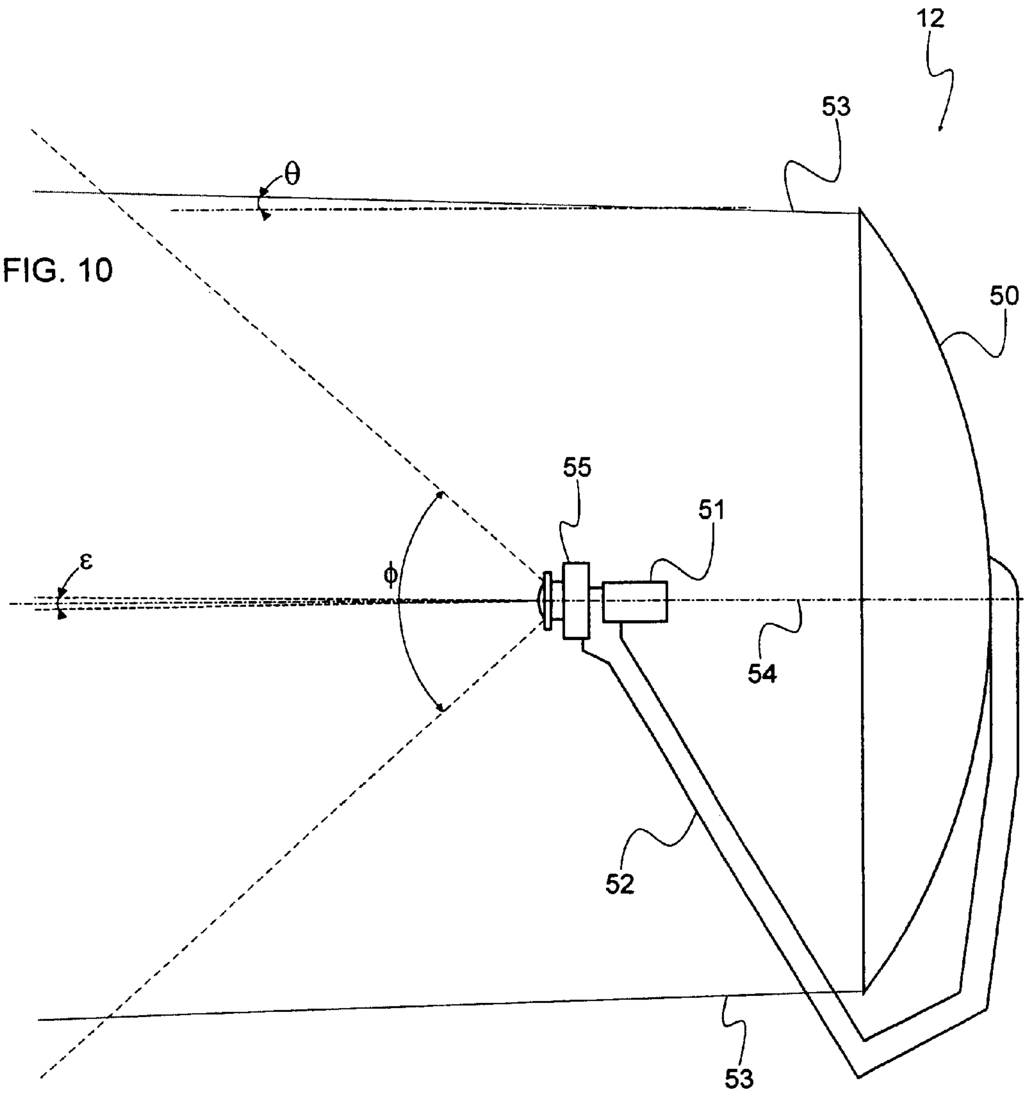
FIGS. 10 and 11 illustrate a second embodiment of an antenna according to the invention.
Figure 11:
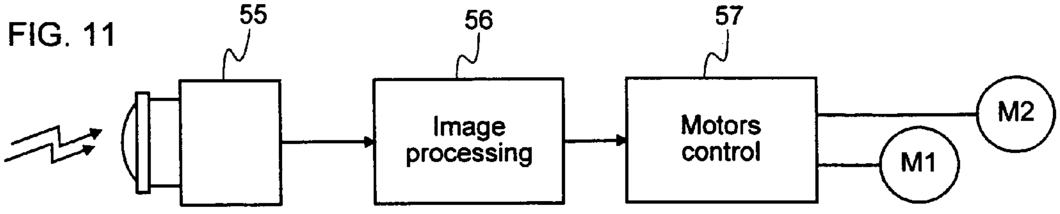

A second embodiment of a receiving antenna 12 will now be described with reference to FIGS. 10 and 11. The receiving antenna 12 comprises a parabola-shaped reflector 50 and a source 51 held at the focus of the parabola by at least one arm 52. The reflector 50 and the source 51 cooperate according to well-known principles in order to receive the electromagnetic waves arriving in a reception cone 53 whose generatrices form an angle θ with respect to the central axis 54 of the parabola.

A matrix sensor device 55 is placed on the central axis 54. The matrix sensor device comprises, for example, a wide angle objective having an aperture angle ϕ, the objective focusing onto a matrix sensor, for example of CCD type sensitive to the wavelength of the IR diodes 15 (a conventional CCD for diodes emitting visible light). The aperture angle ϕ must be relatively high so as to have a wide view of wherever the camera is moving around. The aperture angle ϕ is for example 135°.

Despite the wide angle of the objective, the accuracy with regard to a dot of the sensor can be very small. A sensor having a spatial resolution of 640×480 dots makes it possible to obtain an angle accuracy ε of less than 1°. An image processing device 56, receiving the images from the matrix sensor device 55, filters the images so as to locate the flashing dots, the flashing of the dots being representative of a baseband message corresponding to the number of the camera. The image processing device transmits the coordinates of the camera to be followed to a circuit for controlling the motors 57 which formulates the presets to be despatched to the motors M1 and M2. The object of the presets despatched to the motors is to displace the antenna so as to place the point representative of the camera at the centre of the matrix sensor. Such a device makes it possible to use a very tight reception cone without operating limitations.

Of course, other variants are possible. It is possible to use other systems of sensors. For example, it is possible to use alone, or as an adjunct to the first embodiment, a central sensor fitted with a dichroic filter whose transparency varies as a function of the angle of incidence, or a filter of variable density. The central sensor then provides a signal whose amplitude depends on the angle of incidence of the rays received. A displacement of the antenna is manifested as an increase or a decrease in the amplitude of the signal from the central sensor. The slaving of the antenna then holds the amplitude of this signal at the maximum.

Also, in the preferred examples, the antenna used is of parabolic type but the person skilled in the art can use other types of directional antennas. Among directional antennas, it is in particular possible to use active antennas or electronically switched antennas. Switched antennas do not need to be moved since the directivity of the antenna is achieved by switching reception lobes, the control circuits being modified as a consequence.

The invention claimed is:

1. Video transmission system comprising:

a camera including a transmitter for sending image by radio frequency and identification means for transmitting a locating signal; and a directional antenna for receiving the image from the transmitter of the camera, the antenna including locating means for locating the locating signal and a servo-control means for directing the antenna at the transmitter of the camera.

2. System according to claim 1, wherein the identification means is an optical means.

3. System according to claim 2, wherein the optical means is an emitter of visible light.

4. System according to claim 2, wherein the optical means comprises an infrared emitter (14).

5. System according to claim 1, wherein the locating means comprises a matrix sensor.

6. System according to claim 5, wherein the matrix sensor is placed at the centre of the directional antenna.

7. System according to claim 1, wherein the locating means comprises at least three detectors.

8. System according to claim 7, wherein the detectors are situated around the perimeter of the antenna.

9. System according to claim 1, wherein the locating signal identifies a camera from amongst several cameras.

10. Directional antenna for receiving the images from a camera, the antenna comprising a locating means for locating a locating signal and a servo-control means for directing the antenna at the transmitter of the camera.

11. Antenna according to claim 10, wherein the locating means comprises a matrix sensor.

12. Antenna according to claim 11, wherein the matrix sensor is placed at the centre of the directional antenna.

13. Antenna according to claim 10, wherein the locating means comprises at least three infrared detectors.

14. Antenna according to claim 13, wherein the detectors are situated around the perimeter of the antenna.

* * * * *